April 30, 1963  J. J. BRADY  3,087,252
HIGH ANGLE INCLINATION AND DIRECTIONAL RECORDER
Filed Dec. 14, 1959  3 Sheets-Sheet 1
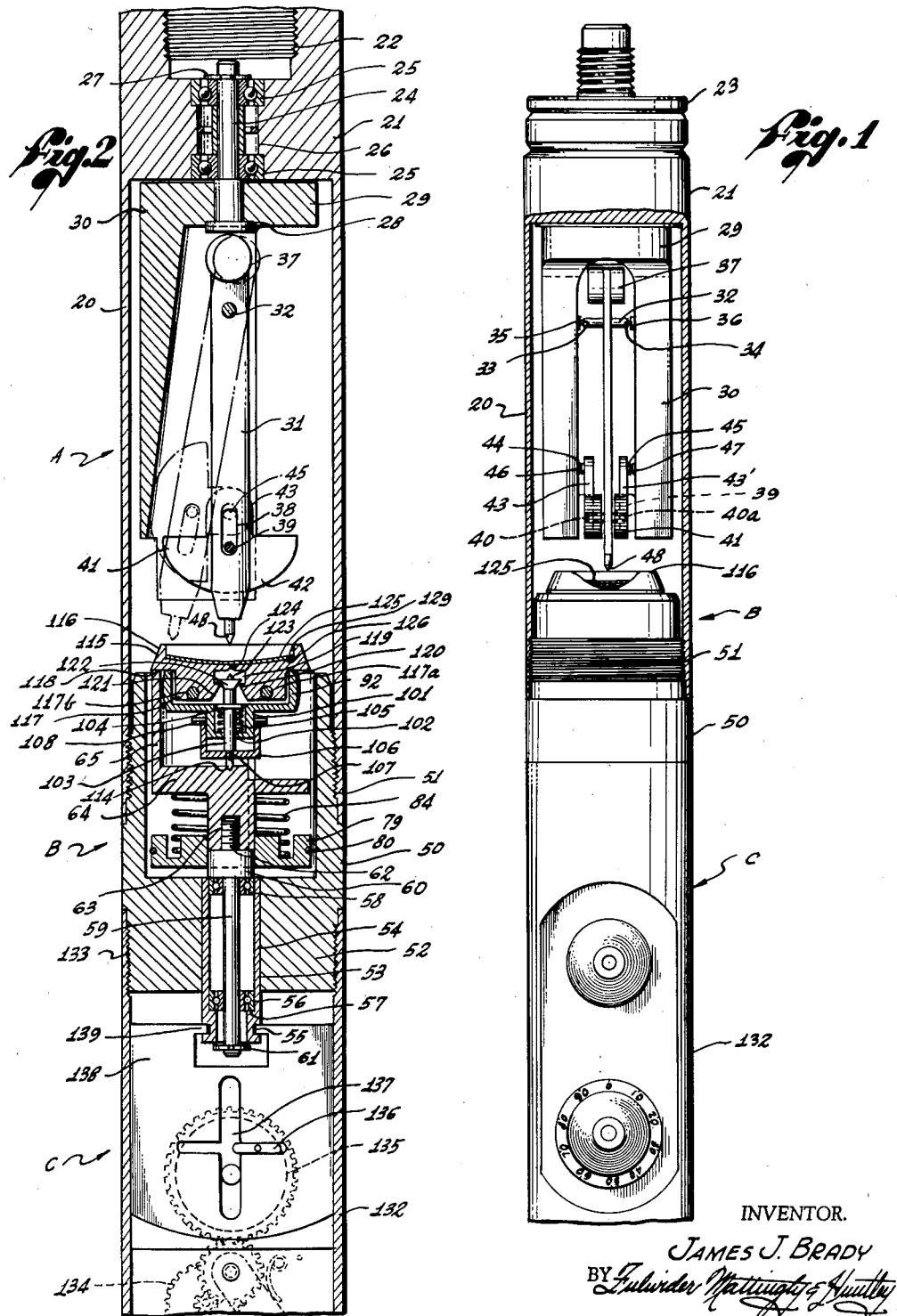
INVENTOR.
JAMES J. BRADY
BY *Fulwider Mattingly & Huntley*
ATTORNEYS April 30, 1963 J. J. BRADY 3,087,252
HIGH ANGLE INCLINATION AND DIRECTIONAL RECORDER
Filed Dec. 14, 1959 3 Sheets-Sheet 2
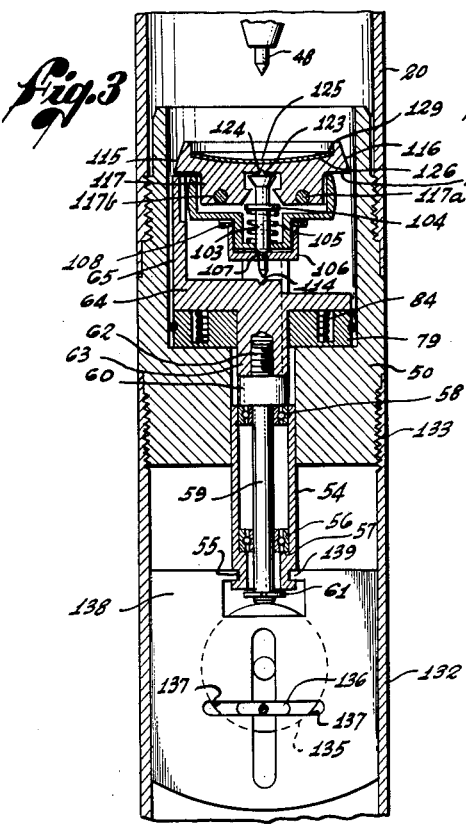
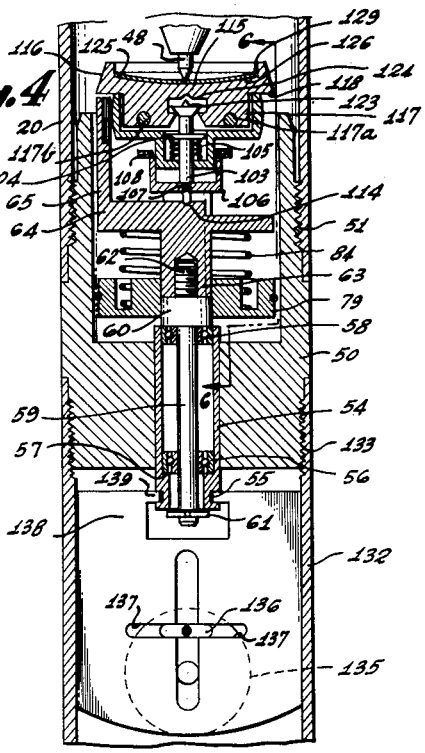
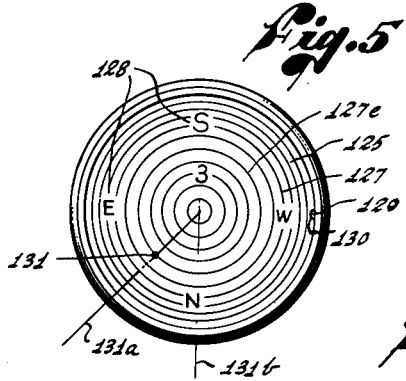
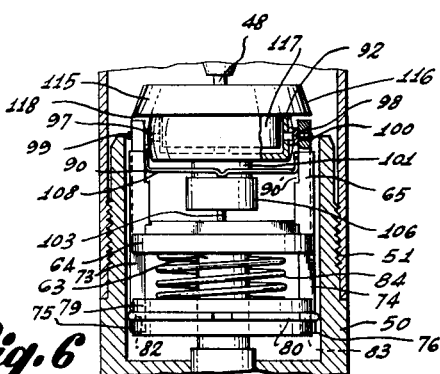
INVENTOR.
JAMES J. BRADY
BY
Attorneys

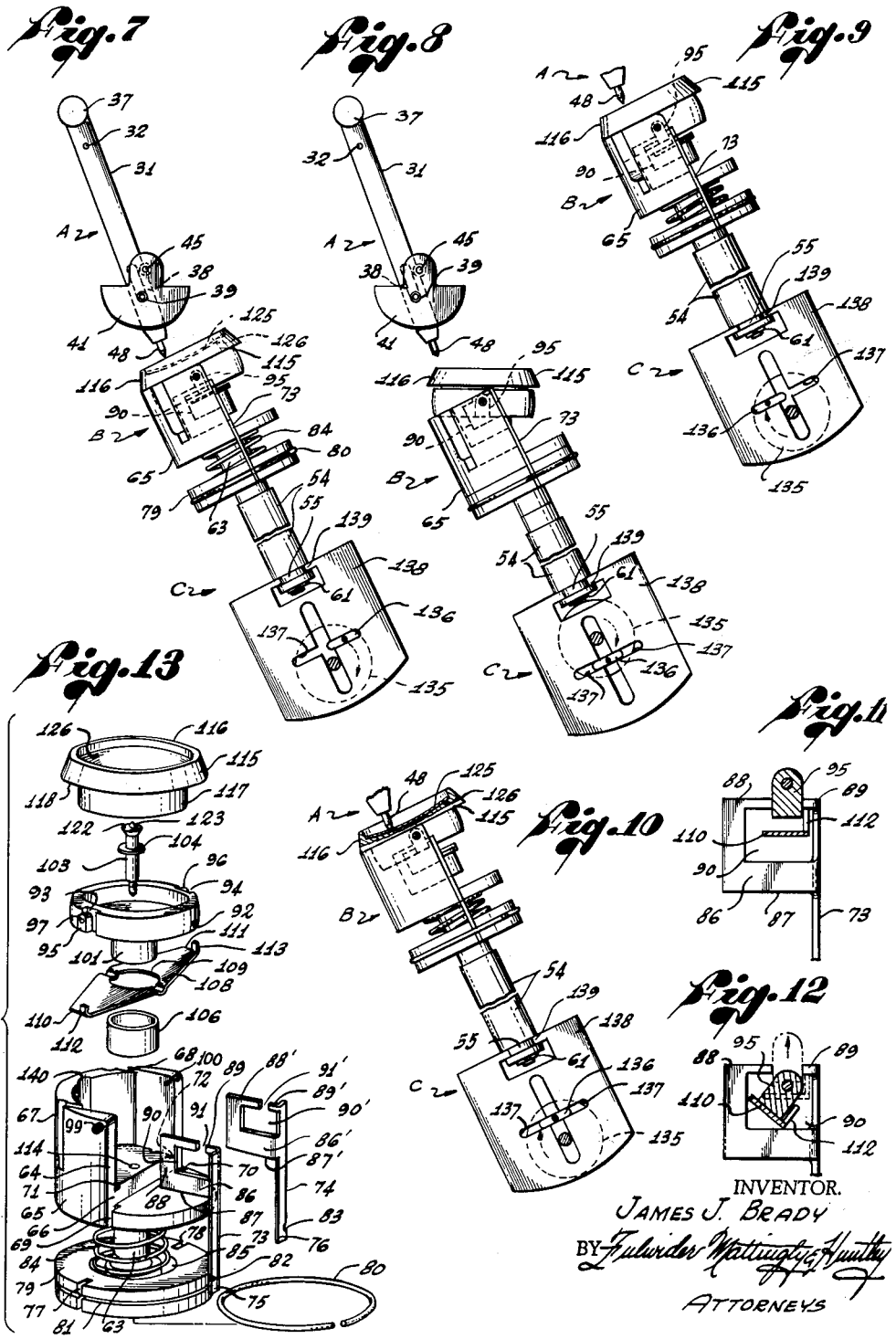

United States Patent Office 3,087,252
Patented Apr. 30, 1963

3,087,252
HIGH ANGLE INCLINATION AND DIRECTIONAL RECORDER
James J. Brady, North Hollywood, Calif., assignor to Technical Oil Tool Corporation, Los Angeles, Calif., a corporation of California
Filed Dec. 14, 1959, Ser. No. 859,188
13 Claims. (Cl. 33—205.5)

This invention relates to well survey instruments and more particularly to an improved form of instrument for measuring and recording the inclination and azimuthal direction angles of a well bore which deviates from the vertical by a relatively large angle.

In the art of well drilling it is necessary to make frequent determinations of the orientation of a well bore. Where it is intended that a well be drilled vertically downward, the accidental angular deviations from the vertical are usually quite small. One type of inclination and directional recorder which is admirably suited for measuring such small angles is disclosed and claimed in U.S. Patent No. 2,829,443, issued on April 8, 1958 to A. J. Abs and assigned to the assignor of the present application. Broadly, in the Abs device a pendulum is suspended in an elongated tube which is dropped into the well bore. Normally, the diameter of such a tube must be somewhat less than 2″ in order to be received within the well. Within the tube, a compass oriented slightly concave disk positions a chart beneath a pointer on the end of the pendulum. Under the control of a timing mechanism, the apparatus is first brought to rest in the bottom of the well bore, the compass supported chart is then oriented to the magnetic north, and finally the pendulum supported marker is brought into contact with the chart leaving an impression thereon which by its relationship to the markings on the chart affords an indication of the inclination and directional angles of the well bore at the time the reading was taken. Of course, the device depends for its operation upon the fact that the gravity pendulum will seek a vertical position within the tubular housing which in turn is aligned along the axis of the bore. Since this housing has a relatively small diameter, a pendulum of any reasonable length is limited in its angular displacement by the fact that for relatively large angles it will tend to strike against the side of the tube.

The Abs type of device is thus well suited for control of vertical drilling. Frequently, however offest or slant drilling is required. In slant drilling, angles ranging between 20° and close to 90° are frequently encountered. Such drilling is used, for example, to reach oil deposits submerged under the ocean through a well slant drilled from the shore.

In such offset or slant drilling, it is necessary at times to determine the inclination of the bore relative to a vertical axis and the direction of the bore in azimuth, in order that the bottom of the bore may in fact be properly located, as intended. One form of directional inclination recording apparatus suitable for use in measuring such large angles is disclosed in FIGURES 19 through 23 of U.S. Patent No. 2,770,887, issued to A.R. Barnett et al. on November 20, 1956 and assigned to the assignee of the present application. In this device, a substantially hemispherical chart is suspended to be oriented so that a great circle reference plane assumes a gravitationally controlled level position and so that the chart is rotated to a predetermined orientation with respect to the magnetic north. The chart is then marked by a pointer which is maintained in a fixed relation with the axis of the bore. While such an arrangement is capable of achieving the desired measurement of large angles, it is in many applications preferable to have as an end product of the measurement a relatively flat chart, such as used in the small angle Abs device and which may be readily stored in files or with the records of the drilling rather than the hemispherical chart used in the Barnett device. Such flat charts do not require any special reading apparatus and may be made of paper rather than metal.

Thus, in the Abs device the chart comprises a small section of the sphere of large radius corresponding to the long pendulum arm. Within the small diameter tube, such an arrangement can measure only small angles but does give a relatively flat chart. In the Barnett device, large angles are measured by using a large section of a sphere of smaller radius (less than half of the diameter of the tube) and hence of greater curvature which results in a metal hemispherical chart which is difficult to read and cannot readily be filed. In the present instrument, a mechanism is provided which will measure and record large angles on a chart comprising a small section of a sphere of large radius, such as used in the Abs device so that the paper chart is relatively flat and may easily be filed.

Although many other instruments have been proposed for the purpose of recording both inclination and direction of the well bore at both small and large angles, their results have been quite unsatisfactory. The mode of operation of many prior devices is such that they are not reliable or accurate under the rugged operating conditions encountered. Such rugged operating conditions include relatively high temperature and pressure and substantial mechanical agitation during the drilling process. Still other devices are complex and difficult to operate. For example, devices depending upon electrical power sources must either have a self-contained source, or a connection to the surface. Neither of these supply methods is reliable. Likewise, photographic elements are only partially successful in the high operating temperatures and pressures of a well bore.

Hence, in order to obtain the desired information as to inclination and direction of the bore, it is preferred to lower or drop a recording instrument within the well bore, allow it to come to rest at the bottom of the well, make and record the measurement under the control of a timing mechanism, and then recover the instrument from the well. Because of the increased speed of descent, and simplicity of operation, the method of dropping the instrument into the well bore is highly favored over methods employing wire lines or cables for lowering the instrument. Although the instrument may be encased within a protective shell or "go-devil," it can be appreciated that the delicate internal mechanism is subjected to extreme shock conditions during the descent and on landing on the bottom of the bore.

It is, therefore, desirable to provide a self-contained mechanically operated instrument which is of durable mechanical construction and which provides protection for all of the delicate measuring and indicating assemblies contained therein. At the same time, it is desired that the instrument should be capable of providing a positively marked substantially flat record on a paper chart of the direct reading type suitable for filing and containing all of the desired information as to both inclination, high or low, and azimuthal direction of such inclination. In the instrument of the present invention, this recordation of even large angles on a relatively flat direct reading chart, is achieved within a small diameter elongated tubular instrument suitable for dropping into the usual well bore.

It is therefore an object of this invention to provide apparatus for measuring and recording inclination and directional angles of a well bore of up to 90° on a substantially flat chart carried in a relatively small diameter tubular casing.

It is a further object of the invention to provide a simplified form of high-inclination and directional recorder which utilizes a releasable pivotal support for an indicating assembly carrying a single direct reading chart.

It is a still further object of this invention to provide a controlled angle indicator and centrally pivoted azimuth indicator which are associated to accurately mark drift or inclination between 0° and 90° and compass heading or direction thereof upon a single relatively flat direct reading paper chart.

It is still another object of this invention to provide such an indicating instrument having mechanism to protectively support a compass unit which may be released on a pivot to accurately indicate compass direction.

It is yet another object of this invention to provide gravitationally controlled automatic orientation of the angle indicator and compass indicating head which permits relatively simple locking and engaging mechanism to be used to ensure accurate recording irrespective of the angle of the inclination.

Still another object of this invention is to provide such an instrument wherein a relatively long pivotally mounted marking pointer is controlled in its motion by a pendulum of relatively short arm length to cooperate with a gravitationally and compass controlled chart carrying indicating head in recording inclination angles between 0° and 90° on a reduced chart scale.

Other objects, features, and advantages of the present invention will be more fully apparent to those skilled in the art from the following detailed description taken in connection with the accompanying drawings in which like reference characters refer to like parts throughout and wherein:

FIGURE 1 is a view partly in elevation and partly in longitudinal section of the general assembly of a preferred form of the directional inclination recorder;

FIGURE 2 is a longitudinal sectional view of the operating assembly taken at right angles to FIGURE 1;

FIGURE 3 is a partial longitudinal sectional view similar to FIGURE 2 showing the compass pivot engaging the indicating head or compass;

FIGURE 4 is a partial longitudinal sectional view similar to FIGURE 2 showing the recording position of the angle indicator, compass and single direct reading chart;

FIGURE 5 is a plan view of the indicating head and record chart;

FIGURE 6 is a view partly in longitudinal section and partly in elevation taken along the line 6—6 in FIGURE 4;

FIGURES 7, 8, 9, and 10 are elevational views of the indicating head, angle indicator, and timing mechanism showing the initial, compass orienting, compass lock, and marking positions, respectively;

FIGURES 11 and 12 are enlarged detail views showing the relative movement of the gimbal levers and cam mechanism in the locked and unlocked positions of the compass indicating head, respectively;

FIGURE 13 is an exploded view of the indicating head including support and control mechanism therefor.

In order to clarify the description of the use and operation of the instrument of the present invention, it is convenient to first define certain terms which will be used throughout the specification.

By the "vertical" or "vertical direction" at any point on or in the earth is meant the direction defined by a radial line extending from the center of the earth through the given point.

By the "horizontal" or "horizontal plane" at any given point is meant the plane passing through that point perpendicularly to the vertical to form a right angle with the vertical at that point.

By the "axis" or "axial direction" of a well bore is meant the straight line joining the centers of the top and bottom of the well bore, respectively.

By the "transverse plane" is meant the plane passing perpendicularly through any given point on the axis of the well bore to form a right angle with the axis.

By the "plane of inclination" or "axial plane" of a well bore is meant the vertical plane defined by the axis of the well bore and the center of the earth. Of course, there is a unique plane of inclination for any well bore which does not lie exactly in the vertical direction. Where the axis of the well bore lies in a vertical direction, its projection passes through the center of the earth and no single unique plane is defined. Also, for a vertical bore, the transverse plane coincides with the horizontal plane.

By the "inclination" or "angle of inclinaiton" of the well bore is meant the acute angle formed by the intersection of the axis of the well bore and the vertical direction at any given point. It is apparent that this angle is in the plane of inclination. This angle of inclination is also frequently referred to synonymously as "drift." The drift or inclination angle is also equal the angle formed between the transverse and the horizontal planes.

By the "directional" or "azimuthal" angle or "compass heading" of the well bore is meant the angle between a line extending in a northerly direction in an horizontal plane at any given point and the line formed by the intersection of the plane of inclination of the well bore and the horizontal plane at the given point. In practice, the northerly direction used is local magnetic north but the readings can readily be corrected for true north from known charts of the local direction of the earth's magnetic field or deviation.

As noted above, the instrument of the present invention measures and records on a relatively flat direct reading chart both the inclination and directional angle of such inclination of a well bore for large as well as small values of these angles.

As will be described in greater detail hereinafter, the instrument of the present invention comprises generally an elongated tubular housing in which are disposed three separate but co-acting subassemblies. These three subassemblies are indicated in FIGURES 1 and 2 by the reference letters A, B, and C. The reference letter A refers to an orienting weight supported angle indicator assembly including a pendulum controlled, pivotally mounted, marking pointer 31 having a marking tip or pin 48. The reference letter B refers generally to the orienting weight gimbal supported compass or indicating head assembly 116 which carries the calibrated chart 125 to be marked by the pin 48 of the pointer 31 and which has a releasable pivot protecting and carrying mechanism permitting accurate compass orientation of the chart in the horizontal plane established by the orienting weight and gimbal support and thereafter permitting a locking of the indicating head assembly in the transverse plane for recording engagement with the marking pin or pointer 48. The reference character C refers generally to a clocklike or time controlled actuating mechanism for imparting relative sequential movement to the parts and elements of the indicating head assembly of the inclination and directional recording mechanism to produce the necessary sequence of steps in the measuring and recording operation. The time controlled actuating mechanism C may be of the same type as has been disclosed in detail in the beforementioned patents to Abs and Barnett.

Referring now to FIGURES 1 and 2, it will be noted that the angle indicating assembly A is disposed within an elongated tube 20 which has a solid integral end head 21 formed thereon. The head 21 has an upper inner threaded socket 22 adapted to receive a conventional "go-devil" connecting cap or plug 23.

The indicating assembly A includes an angle indicator orienting weight 30 which is carried on a rotatable stub shaft 24 that is journaled by a pair of ball bearings 25 mounted in a bore 26 coaxially formed in the head 21. The rotatable shaft 24 is hung from a washer 27 and has an enlarged lower end 28 supporting an annular top portion 29 of an orienting weight 30. The depending portion of the orienting weight 30 is of an approximately semi-cylindrical form so that the center of gravity of the integral assembly 29—30 is eccentrically located with respect to the longitudinal axis of the tubular housing 20 and of the axis of rotation of stub shaft 24.

Since the top 29 of the orienting weight 30 is integrally attached to the rotatable stub shaft 24, it is apparent that the orienting weight 30, in any inclined position of the instrument, will rotate under the influence of gravity so that the center of gravity of the orienting weight comes to rest in the plane of inclination of the well bore in which the instrument is positioned.

An angle indicator or pointer 31 is pivotally mounted for angular rotation in the aforesaid plane of inclination by a pin 32 which projects laterally therefrom near its upper end. As best shown in FIGURE 1, dual pivot points 33 and 34 on the ends of pin 32 are supported in pivot seats 35 and 36, respectively, formed on the opposite inner surfaces of the half-cylindrical portion of the orienting weight 30. A counter weight 37 is attached to the upper end of the pivotally mounted pointer 31 to statically balance the pointer about its pivot axis. The fact that the center of gravity of the orienting weight 30 will come to rest in the plane of inclination of the axis of the housing 20, assures that the pivot axis of pin 32 will be perpendicular to this plane and hence that the pointer 31 will rotate in this plane of inclination.

A vertically extending slot 38 adjacent the lower end of the elongated pointer 31 is shaped and adapted to receive a pointer guiding pin 39 secured at its outer ends 40 and 40a to opposite inner sides of a bifurcated pendulum bob or weight 41. Weight 41 is formed with a central slot 42 through which the pointer 31 extends and across which the pin 39 is mounted. This slot 42 in the pendulum 41 receiving the pointer 31 and having the guiding pin 39 therein which is in turn received within slot 38 in the pointer 31, produces the above discussed reduction ratio between the angular movement of the pendulum 41 and the resulting angular movement of the pointer 31 bearing the marking pin 48.

The pendulum 41 is pivotally mounted on dual spacer ears 43 and 43' which extends upwardly from the weight 41 and are pivoted at 44 and 45 in seats 46 and 47, respectively, which in turn are formed in the lower inner sides of the orienting weight 30.

It will thus be noted that the pivotal axis of the pointer 31 about pin 32 and of the pendulum weight 41 about points 44 and 45 are parallel to each other and are displaced from each other along the axis of the instrument in the tube 20. Thus, when the orienting weight 30 has settled down so that the instrument is in the starting position shown in FIGURE 7 after having been dropped into the bottom of the well bore, the pivotal axis of both the pointer 31 and the pendulum 41 will be perpendicular to the plane of inclination of the well bore so that both the pointer 31 and the pendulum 41 will swing or oscillate in this plane. The gravitational movement of the ball bearing supported orienting weight 30 depends, as noted above, on the inclination and direction angles of the elongated tube 20 which extends parallel with the axis of the well bore and this gravitational movement is entirely free and automatic.

The pointer 31 of the angle indicator A is pivotally balanced and guided in the orienting weight 30 by the gravitationally produced motion of the pendulum bob or weight 41. The relative positions of the pivotal axes of pointer 31 and weight 41 and their relative arm lengths are calculated so as to accurately indicate on the chart 125 (depending upon its radius of curvature) the well bore drift or inclination from 0 to approximately 90°. That is to say, the reduction ratio produced between the actual angular movement of pendulum weight 41 from the horizontal position shown in FIGURE 2 to the starting position shown in FIGURE 7 produces a proportionately reduced angular motion of the pointer 31 so that a larger angular motion of the pendulum may be indicated by a smaller angular motion of the pointer to be recorded on the relatively flat chart 125. The calibration of the chart is drawn on a scale which multiplies by a factor such as to compensate for the use of the reduction factor necessary to operate the instrument within the small diameter bore. The reduction factor involved depends upon the relative arm lengths of the pendulum 41 and pointer 31, respectively, and upon the distance between their pivot axes and the position of the interaction between these members as determined by pin 39 riding in slot 38. By suitably choosing or varying these parameters, the desired reduction ratio between the angular movements of pendulum 41 and pointer 31 can be achieved.

The motion of the pointer 31 which typically results from a motion of the pendulum 41 is illustrated in FIGURE 2 wherein the position occupied by these parts when the tube 20 is in a vertical position is shown in solid lines and the position occupied by these parts when the tube 20 is inclined is shown in dotted or phantom lines. Preferably, the radial arm length (from pivot axis to tip) of pointer 31 is large by comparison to the radius of the instrument housing, and the radial arm length of the pendulum is smaller than the radius of the housing to permit the pendulum to swing freely therein through any desired angle up to at least 90° with respect to the longitudinal axis of the housing to make the desired record.

Broadly, the sequence of operations carried out in the instrument to make the above described record is determined by the time controlled actuating assembly C. As shown in FIGURE 2, assembly C includes a clock controlled gear train 134 which rotates a standard timing cam 135. The cam 135 has an eccentrically mounted pivoted driver 136 which operatively engages a series of cam slots 137 in a yoke 138 which is adapted to be moved vertically up and down in the manner described in the above referred to patents to Abs and Barnett. The yoke 138 has a pair of bifurcated jaws 139 which are adapted to engage a groove 55 in a compass piston 54 to afford vertical movement to the piston. The piston 54 and an actuating shaft 59 serve to transmit the sequence of timed motions resulting from rotation of the cam 135 to the indicating head assembly B to actuate it in the desired sequential manner through the series of positions shown in FIGURES 7, 8, 9, and 10.

The compass or indicating head supporting assembly B is carried on a clock spacer or coupling 50 which is threadedly connected at 51 in the lower end of the elongated tube 20. The clock spacer 50 has a lower hub 52 bored centrally at 53 to slidably receive the tubular compass piston 54. The piston 54 has a circular groove 55 adjacent its lower end which is in engagement with the bifurcated jaws 139 of the yoke 138 driven by the clock timing and actauting mechanism C as before described.

A ball bearing 56 is carried in a seat 57 formed within the lower end of the compass piston 54 and an upper similar type bearing assembly 58 is pressed within the upper end of the tubular piston 54. An orienting weight supporting and actuating shaft 59 is rotatably hung in the dual bearing assemblies 56 and 58 by means of an enlarged upper end 60 and a lower lock and washer assembly 61.

The actuating shaft 59 has a threaded upper extension 62 engaging a mating recess in a boss 63 depending from a base 64 of a substantially half-cylindrical shaped compass orienting weight 65. The orienting weight 65 is small but of a shape similar to the above described angle orienting weight 30. Weight 65 is provided with ball bearing supports 57 and 58 as beforementioned so that it is free to rotate about the longitudinal axis of shaft 59 to automatically seek its position of stable equilibrium under the influence of gravity when the instrument has come to rest in the bottom of the well bore. Thus, the weight 65 in which the compass assembly is gimbal mounted, will seek a position in which its center of gravity is in the plane of inclination of the well bore just as will the orienting weight 30.

The details of the compass or indicating head B and its supporting mechanism may be seen particularly in FIGURES 2, 3, 4, and 6 of the drawings. The various component parts of this assembly may be seen in individual detail in the exploded view of FIGURE 13.

Referring particularly to FIGURE 13, it will be seen that the half-cylindrical compass orienting weight 65 rises from its base section 64 which is cut away at 66 to form a small horizontal surface to which parts may readily be attached. The half-cylindrical section 65 of the orienting weight is slotted vertically at 67 and 68, respectively, at opposed sides of the cylindrical section by slots extending parallel to the axis thereof. Dual lateral slots 69 and 70, respectively, are formed in the base 64 adjacent to the cut away portion 66. Dual small horizontal crevices 71 and 72, respectively, are formed on the upper surface of the base 64 and immediately adjacent to the offset 66. When the instrument is assembled, the slots 67 and 68, 69, and 70, and crevices 71 and 72 coact to receive gimbal levers 73 and 74.

The dual gimbal levers 73 and 74 have lower attachment ends 75 and 76, respectively, engaging slots 77 and 78, respectively, in a generally disk shaped gimbal lever support 79. A wire ring 80 seats in engaged relationship in a peripheral groove 81 in the disk shaped lever support 79 and the ring 80 passes through grooves 82 and 83, respectively, formed in the edges of lower ends 75 and 76 of the levers 73 and 74. The vertical positioning of the levers 73 and 74 in the gimbal lever support is thus provided.

The lever support disk 79 is slidably mounted on the boss 63 of the orienting weight 65 for relative longitudinal movement with respect thereto. A coil spring 84 which rests in a circular recess 85 formed in the upper surface of the lever support 79 biases the weight 65 in an upward position relative to the support 79.

The upper ends of gimbal levers 73 and 74 are identical and only one will be described, although prime identifying characters will be applied to corresponding parts of the other lever. The lever 73 is slidable against the inner edge of half-cylindrical orienting weight 65. Adjacent the upper end of lever 73, a cam receiving section 86 is bent inwardly to normally engage the vertical slots 67 in the orienting weight 65. Cam section 86 has a horizontally disposed lower edge 87 which is normally disengageably received within the crevice 71 on base 64. An upwardly and inwardly extending arm 88 has a portion extending or projecting inwardly toward an opposed inwardly extending tip 89 struck inwardly from the upper end of the lever 73. The oppositely disposed arm 88 and tip 89 form a rectangular cam recess 90 to which access is provided through a small vertically disposed cam path or locking slot 91 formed immediately between the inwardly projecting portion of arm 88 and tip 89.

A compass or indicating head gimbal ring 92 (shown in perspective in the upper portion of FIGURE 13) has dual, external vertical slots 93 and 94, respectively, on diametrically opposed sides of its generally cylindrical side wall. Fixedly secured within the slots 93 and 94 and extending outwardly slightly beyond the slot are dual straight-sided cams 95 and 96, respectively. The cams 95 and 96 have pivot seats 97 and 98, respectively, formed therein. As may be more clearly seen in the detailed view of FIGURE 6, the pivot seats 97 and 98 are adapted to receive the dual pivot points of attachment screws 99 and 100, respectively, which in turn are threadedly mounted diametrically opposite each other in the inner upper ends of the orienting weight 65.

As may be seen particularly in FIGURES 6 and 13, the compass or indicating head gimbal 92 has a depending boss 101 apertured centrally at 102 (see FIGURE 2). A compass or indicating head pivot shaft 103 depends through the opening 102. The shaft 103 has an intermediate flange 104 which is urged upwardly by a coil spring 105 seated on the bottom internal end of boss 101 and bearing upward against the flange 104. A cup shaped sleeve 106 is apertured at 107 to receive in pressed fixed connection the depending lower end of the compass pivot shaft 103 which is slidably received in the boss 101. Longitudinal movement of the boss 101 relative to the cup 106 controls the movement of the compass pivot shaft 103.

As may be most clearly seen in FIGURE 13, a flat spring 108 is apertured centrally at 109 for movement on the boss 101. The outer ends 110 and 111 of the spring 108 extend beneath the lower edges of cams 95 and 96, respectively. Dual upwardly extending narrow tips 112 and 113 on the spring ends 110 and 111, respectively, have engageable connection with arms 89 and 89', respectively, of the gimbal levers 73 and 74.

In FIGURES 11 and 12, the tip 112 and spring end 110 are shown in their engaged position and in their released position, respectively, with respect to arm 89.

In FIGURE 11, it will be noted that the parts are in their engaged position whereas in FIGURE 12, the parts are shown in solid line in their released position in which the compass is free to rotate about the gimbal axis to seek a horizontal plane under the influence of gravity. The gimbal axis, like the axis of rotation of pointer 31 is positioned in perpendicular relation to the plane of inclination of the well bore by the gravitational rotation of orienting weight 65.

As may be seen in FIGURES 6 and 13, the flat spring 108 applies pressure to the cup or sleeve 106 centrally and unless the gimbal ring 92 and cams 95 and 96 are released, spring 108 normally urges cup 106 and compass pivot shaft 103 secured thereto downwardly to the positions shown in FIGURES 2, 4, and 6. This downward spring bias position of the cup 106 and compass pivot shaft 103 engages the lower end of the shaft 103 in a shallow recess 114 formed centrally in the base 64 of the orienting weight 65. Release of the cams 95 and 96 as shown in FIGURES 3, 8, and 12, releases the flat spring 108 and the cup 106. The delicate coil spring 105 is then able to raise the released compass pivot shaft 103 to the compass suspending positions, shown in FIGURES 3 and 8. The relative coaction of the springs 105 and 108 may be seen by comparing the positions shown in FIGURES 2 and 3.

The compass or indicating head 115 is formed with an upper cup-shaped holder 116 and a lower circular boss 117 forming a circular gimbal and orienting weight seat 118. The boss 117 supports a pair of spaced parallel bar magnets 117a and 117b, as may be seen in FIGURE 2. A socket 119 in the boss 117 is flared at 120 to form a compass trapping and compass pin support 121. The compass pivot shaft 103 has an upwardly flared flange 122 below a compass pivot pin 123 which is mounted for timed cyclical engagement and disengagement with the compass pivot seat 124 in order to pivotally suspend the compass or indicating head 115 in the second position shown in FIGURE 8 for free rotation about the pin 123 so that the bar magnets may align the chart 125 with the magnetic north. The enlarged detail views of the FIGURES 3 and 4, respectively, illustrate the engaged and disengaged positions of the compass suspending pin 123 with respect to the pivot seat 124.

As noted above, the direct reading chart 125 may be formed of paper or soft metal for making an impression from the marking pin 48 and is removably pressed into the shallow concave seat 126 formed in the upper surface of the holder 116. The radius of curvature of the seat 126 against which the chart 125 is snugly received is the same as the radial arm length of the pointer 31 carrying the marking pin 48 so that the arc through which the marking pin 48 swings in rotating about the pivot axis of the pointer 31 is such as to keep the normal spacing of the pin from the chart 125 during a given part of the cycle at a constant value for any angular degree of inclination of the compass 115 and angle indicating assembly A. Of course, the actual distance between the chart and the marking pin at each step of the cycle of operation is controlled by the movements of the parts of the indicating assembly B through uniform distance increments under the control of timing mechanism C to reproduce the four different positions shown in FIGURES 7, 8, 9, and 10, for any angular position of the instrument.

When the compass or indicating head 115 is supported for free rotation on the pivot pin 123, the magnets 117a and 117b swing the head so that they are pointed toward the magnetic north pole. Since chart 125 functions as a compass card, it is necessary that chart 125 be positioned in the holder 116 with the markings of the compass rose in alignment with the bar magnets. The holder 116 is therefore provided with a small indexing pin 129 which fits within an aperture 130 in the edge of the chart 125, as may be seen in FIGURE 5. The protrusion of a pin 129 through the aperture 130 in each of the charts 125 thus assures that each chart as it is placed in the holder is properly indexed or oriented relative to the holder.

As noted above, there is also shown upon the chart 125 a representative mark 131 which is the kind of record that will be made upon the chart when it is engaged by the marking pin 48. As illustrated herein, by way of example, the mark 131 shows that the well bore is inclined from the vertical through an angle of approximately 45°, and that such inclination of the well bore has a southwest heading or drift. The heading of the well bore as shown is, of course, a magnetic heading, but this may easily be converted to a true heading by applying local deviation to the instrument reading. The single mark 131 therefore provides a direct reading, permanent record of both inclination and direction of inclination. After the instrument has been inserted and withdrawn from a given well, the chart 125 is removed and a new chart is placed in the instrument for making the next reading.

The clock assembly C which actuates the above discussed elements through the cycle of operation shown in FIGURES 7 through 10, includes an elongated tube 132 which, as may be seen in FIGURE 2, is similar to the tube 20. Tube 132 is threadedly attached at 133 to the compass spacer 50. The conventional clock control actuating mechanism is housed in the tube 132. The clock controlled time actuating mechanism which creates the required sequence of operations in the present application has not been shown in detail because it is substantially the same as the structure set forth specifically in the above mentioned patents to Barnett et al. and to Abs, both assigned to the assignee of the present application.

The time controlled actuating assembly C as illustrated in the present drawings, does show a portion of the clock controlled gear train 134 connected to rotate a standard timing cam 135. The cam 135 has an eccentrically mounted pivoted driver 136 which operatively engages a series of cam slots 137 in a conventional yoke 138. The yoke 138 has a pair of bifurcated jaws 139 adapted to engage the groove 55 in the compass piston 54.

As noted above, FIGURES 7, 8, 9, and 10 illustrate the four different positions of the parts which occur during a complete single rotation of the cam 135 after the timing mechanism has started the rotation thereof. It will be understood that the conventional clock mechanism C which actuates the cam 135 and driver 136 may be set prior to dropping the recording instrument into the well in such a manner that sufficient time will be allowed for the instrument to come to rest and for the pendulum to reach stable equilibrium in the well bore before commencing the timed actuation of the compass or indicating head in the manner to be described. FIGURE 7, it will be recalled, is the starting position and the assemblies A, B, and C are in the relative position shown in detail in FIGURE 2, with the exception that, for the purpose of illustration, the housing 20 is assumed to be positioned at an angle of inclination of approximately 45° in the well bore. The orienting weights 30 and 65 have automatically gravitated to aligned positions in which their centers of mass are in the plane of inclination of the longitudinal axis of the housing and the well bore. The angle indicator 31 and marker 48 have been moved to the deflected position, shown in FIGURE 7, by the angular rotation of pendulum 41. The compass or indicating head 115 is seated on the compass orienting weight 65, as shown in FIGURE 2, and gimbal 92 is locked in the gimbal levers 73 and 74, as shown in detail in FIGURE 11. The compass piston 54 sustains the compass gimbal 92 and the cams 95 and 96 in this locked position. At this time, the tips 112 and 113 of the flat spring 108 engage the under sides of arms 89 and 89'. Pressure is applied through the spring 108 to the cup 106 and thus retracts the compass pivot shaft 103 to the position in which it is engaged in the shallow recess 114. Consequently, the flange 122 on the compass pivot shaft 103 engages the seat 120. In this locked position of the parts, the compass and the delicate compass pivot point or pin 123 are protected during the descent of the instrument into the well bore.

Actuated by the clock mechanism, the cam 135 and driver 136 next make a quarter turn in clockwise direction from the position shown in FIGURES 2 and 7 and move the yoke 138 downwardly to the position shown in FIGURES 3 and 8. Downward movement of the yoke 138 withdraws the compass piston 54 and therefore the orienting weight 65 and compass gimbal 92. The parts then occupy the position shown in detail in FIGURES 3 and 8. The orienting weight 65 compresses the coil spring 84, engages gimbal lever support disk 79, and seats the elements on the upper surface of clock spacer 50. The compass gimbal cams 95 and 96 are thus moved downwardly into the recesses 90 and 90', as shown in FIGURE 12. The flat spring 108 is released and compass gimbal ring 92, which is in released position on its pivots 97 and 98, move into the horizontal plane under the influence of gravity with the compass pivot shaft 103 assuming a free vertical position, as shown in FIGURES 3 and 8. Simultaneously, the delicate coil spring 105 elevates the released cup 106 and the compass pivot shaft 103 to the position shown in FIGURE 3. In this position, the compass pivot pin 123 engages the conical seat 124 and the compass or indicating head 115 is in a free elevated position so that it may rotate in the horizontal plane under the influence of the bar magnets until these magnets are aligned in azimuth with the magnetic north. Inasmuch as the compass orienting weight 65 always gravitates automatically on its bearings to a position of stable equilibrium with its center of mass in the plane of inclination of the well bore, as shown in FIGURE 8, the compass gimbal 92 and the indicating head 115 are always free to execute the above motion even if the angle of inclination of the well should be approximately 90°. A vertical groove 140 is cut on the inner surface of orienting weight 65, as may be seen in FIGURE 13, to permit free swinging motion of the lower end of the compass pivot shaft 103 in the recording of large or high angles of inclination or drift.

After the passage of a sufficient time interval, as measured by the clock mechanism, to permit the compass or indicating head to come to rest in a stable north indicating position, the timing cam 135 and driver 136 begin their next quarter turn movement to the position shown in FIGURE 9. In this next position, the compass piston 54, orienting weight 65 and the associated elements are moved upwardly to the positions they originally occupied in the starting position, shown in FIGURE 7. However, in the FIGURE 9 position, the compass or indicating head 115 is now cam-locked, as shown in FIGURE 11, in a position which accurately indicates the azimuthal direction of the well bore. The associated parts otherwise assume exactly the same position and location, as shown in FIGURES 2 and 7, except that the driver 136 is in a cam slot opposite to that of the starting position.

Under clock control, the cam 135 and driver 136 again move clockwise another quarter turn to the position shown in FIGURES 4, 6, and 10. That is to say, the parts are moved from the directionally orientated locked position of FIGURE 9 to the marking position of FIGURE 10. In this marking position, the cam and yoke movement has elevated the compass piston 54, the compass orienting weight 65, the locked compass gimbal ring 92 and the compass or indicating head 115 as a unitary assembly against the angle indicator marker 48. When the locked indicating unit 115 is moved to the FIGURE 10 marking position, the pin 48 accurately locates a mark such as 131 on the chart 125 to indicate both the well bore inclination and its azimuthal direction, as explained in principle hereinbefore.

Finally, under the predetermined clock cycle control, the cam 135 and driver 136 again move a quarter turn clockwise to return the parts to the starting position, shown in FIGURE 7. If desired, the cycle may then be repeated in order to take a second confirmatory reading. This repetition of the reading is readily accomplished by setting the clock controlled mechanism in a manner well known in the art to repeat the four quarter turns at the desired time interval to produce the above described sequence of operations and bring the instrument back to the rest position of FIGURE 7 preparatory to removal of the instrument from the well bore. If the instrument is operating properly, the second reading should coincide with the first.

After removal of the instrument from the well bore, the chart 125 is removed from the instrument, inspected to determine the reading or readings which have been recorded thereon, and may then be filed in a substantially flat position in any conventional filing system. There is thus preserved a single chart which accurately indicates any degree of inclination from 0° to substantially 90° and the azimuthal direction of the given well bore.

While a particular exemplary preferred embodiment of the invention has been described in detail above, it will be understood that modifications and variations therein may be effected without departing from the true spirit and scope of the novel concept of the present invention, as defined by the following claims.

I claim:

1. An instrument for surveying high-inclination well bores which includes: an elongated housing adapted to be inserted in said well bore; a marking pointer pivotally mounted in said housing, the arm length of said pointer being large relative to the radius of said housing; a pendulum pivotally mounted in said housing, the arm length of said pendulum being smaller than the radius of said housing, said pendulum being mounted for rotation under the influence of gravity through an angle equal to the angle of inclination of said housing; means connecting said pendulum to said pointer to rotate said pointer through an angle which is a predetermined function, less than unity, of the angle through which said pendulum rotates; and means coacting with said marking pointer to record the angle through which said pointer is rotated by said pendulum.

2. An instrument for surveying high-inclination well bores which includes: an elongated housing adapted to be inserted in such well bores; an orienting weight means mounted in said housing for rotation about the longitudinal axis of said housing, said orienting weight means having a center of gravity which is eccentrically positioned relative to said longitudinal axis whereby said weight means rotates about said longitudinal axis to a position of equilibrium at which the said center of gravity is in the plane of inclination of said longitudinal axis; a marking pointer pivotally mounted on said orienting weight means for rotation about an axis perpendicular to said plane, the arm length of said pointer being large by comparison to the radius of said housing; a pendulum pivotally mounted on said orienting weight means, the pivotal axis of said pendulum being parallel to the pivotal axis of said marking pointer and the arm length of said pendulum being smaller than the radius of said housing to permit said pendulum to swing freely through a large angle in said housing; means interconnecting said pendulum and said marking pointer to control the rotation of said marking pointer through an angle which is a predetermined function, less than unity, of the angle through which said pendulum rotates; and orientated chart supporting means in said housing and coacting with said marking pointer to record on a chart supported by said supporting means the angle through which said pointer is rotated by said pendulum and the azimuthal directional angle of said plane of inclination.

3. In an instrument for surveying well bores: an elongated housing adapted to be inserted in such well bores; an orienting weight supported in said housing for rotation therein about an axis parallel with the longitudinal axis of said housing; an angle indicating pointer and marker pivotally mounted within a portion of said orienting weight; a pendulum pivotally mounted within a portion of said orienting weight; a pin and guiding slot connection between said angle indicating pointer and said pendulum to move said pointer through an angle which is a predetermined function, less than unity, of the angle through which said pendulum moves; and means to record the angle through which said pointer is thus moved.

4. In an instrument for surveying well bores: a tubular housing; a support therein; a time controlled compass actuating piston slidable in said support; an orienting weight mounted in said piston for rotation about the longitudinal axis thereof, said orienting weight having a center of gravity positioned eccentrically with respect to said axis whereby said weight rotates about said axis to a position of equilibrium at which the said center of gravity is in the axial plane of inclination of said axis; a gimbal ring pivotally mounted on said orienting weight for rotation about an axis perpendicular to the plane in which said center of gravity and said longitudinal axis lie; mechanism for locking or releasing said gimbal ring on said weight; a compass and indicating head seated on said gimbal ring; and a compass pivot shaft connecting said gimbal ring and said compass, said pivot shaft being retractable to a compass locking and protecting position and being advanceable to a compass seating and orienting position upon release of said gimbal ring for any angle of well bore inclination from 0° to substantially 90°.

5. An instrument for measuring and recording the angles of inclination and azimuth of a well bore comprising: a pendulum controlled, pivotally mounted marking pointer; a compass controlled indicating head carrying a single direct reading chart calibrated to coact with said marking pointer to record the inclination and azimuthal angles of said well bore; said marking pointer having an arm length which is longer than the arm length of said pendulum so that the pointer swings through an angle of arc which is a predetermined function, less than unity, of the angle through which said pendulum rotates; said chart being a portion of a sphere having a radius of curvature equal to the radius of curvature of the arc through which said pointer swings; said chart being calibrated to read directly the angle through which said pendulum rotates by actually recording the angle through which said pointer swings; and means to sequentially move said indicating head from a locked starting position through a compass orienting position to a chart marking position and then back to said starting position.

6. In an instrument for surveying well bores; an elongated housing adapted to be inserted in said well bore; an orienting weight rotatably supported in said housing; an angle indicating marking pointer pivotally mounted within said orienting weight, said marking pointer swinging through an arc having a radius which is large by comparison to the radius of said housing; a pendulum pivotally mounted within said orienting weight, said pendulum swinging through an arc having a radius which is small by comparison to the radius of said housing so that said pendulum may swing freely through at least 180°; a pin and guiding slot connection between said angle indicating pointer and said pendulum connected to move said pointer through an angle which is a predetermined fraction less than unity of the angle through which said pendulum moves; and a dished chart means to support a chart having a radius of curvature equal to the radius of the arc of swing of said pointer, said chart supporting means being mounted for movement into and out of engagement with said marking pointer to record on such chart the angular position of said pointer.

7. An instrument for surveying high inclination well bores which includes: an elongated housing adapted to be inserted in such well bores; a marking pointer pivotally mounted in said housing, the radial arm length of said pointer being large by comparison to the radius of said housing; a pendulum pivotally mounted in said housing, the radial arm length of said pendulum being small by comparison to the radius of said housing; said pendulum being mounted for rotation under the influence of gravity through an angle equal to the angle of inclination of said well bore; means interconnecting said pendulum and said pointer to rotate said pointer through an angle which is a predetermined function, less than unity, of the angle through which said pendulum rotates; a shallow concave chart having a radius of curvature substantially equal to the radial arm length of said pointer; and means to move the concave surface of said chart into engagement with said marking pointer to record on said chart the angular position of said pointer, said chart being calibrated to compensate for the angular reduction ratio between said pendulum and said pointer so that said chart reads directly in terms of the angle through which said pendulum has rotated.

8. In an instrument for surveying well bores: a tubular housing; a support therein; a time controlled compass actuating piston slidable in said support; an orienting weight rotatably supported on said piston to seek a predetermined angular position with respect to the axial plane of the axis of said housing; a gimbal ring pivotally mounted on said orienting weight, said gimbal ring supporting a spring tensioned compass pivot shaft having a pivot centrally thereof; a compass head seated on said gimbal ring and having a conical pivot receiving seat centrally thereof; and a time controlled piston actuating mechanism for locking and releasing said compass gimbal to provide protective locking of said compass and said pivot out of engagement with said seat in one position of said mechanism and to provide release of said pivot shaft and said pivot into vertical compass supporting and orienting position in engagement with said seat in another position of said mechanism irrespective of the angle of inclination of said well bore.

9. In an instrument for surveying high inclination well bores: an elongated housing adapted to be inserted in such well bores; a marking pointer pivotally mounted in said housing; a pendulum pivotally mounted in said housing for rotation under the influence of gravity through an angle with respect to the longitudinal axis of said housing which is equal to the angle of inclination of said housing; means connecting said pendulum to said marking pointer to rotate said pointer through an angle which is a predetermined function, less than unity, of the angle through which said pendulum rotates; a chart which is calibrated to compensate for said functional pointer rotation; and means to move said compensated chart into engagement with said marking pointer to record on said chart the angle of inclination of said well bore.

10. In an instrument for surveying well bores: an elongated housing adapted to be inserted in such well bores; a pendulum pivotally mounted in said housing; a marking pointer pivotally mounted in said housing, said marking pointer having an arm length greater than the arm length of said pendulum which controls the pointer; control means interconnecting said pendulum and pointer to swing said marker pointer through an angle which is a predetermined function less than unity of the angle through which said pendulum swings; and means coacting with said marking pointer to record the angle through which said pointer is rotated by said pendulum.

11. An instrument for surveying high inclination well bores which includes: an elongated housing to be inserted in such well bores; an orienting weight in said housing mounted for rotation therein about the longitudinal axis of said housing, said orienting weight having a center of gravity which is eccentrically positioned relative to said longitudinal axis whereby said weight seeks a position of equilibrium about said longitudinal axis in which the plane defined by said center of gravity and said longitudinal axis lies in the plane of inclination of said longitudinal axis; a marking pointer supported for rotation with said orienting weight about said longitudinal axis and also pivotally mounted for angular rotation about a pivotal axis perpendicular to said plane; a pendulum supported for rotation with said orienting weight about said longitudinal axis and pivotally mounted for angular rotation about a pivotal axis parallel to the pivotal axis of said marking pointer; means interconnecting said pendulum and said marking pointer to rotate said marking pointer through an angle which is a predetermined function, less than unity, of the angle through which said pendulum rotates; and means coacting with said marking pointer to make a record indicative of the angle through which said pointer is rotated.

12. An instrument for surveying high inclination well bores comprising: an elongated tubular housing adapted to be inserted in such well bores; a first orienting weight suspended in said housing for rotation about the longitudinal axis of said housing, said orienting weight having a center of gravity which is eccentrically positioned relative to said axis whereby said first orienting weight freely rotates about said longitudinal axis to seek a position of equilibrium at which said center of gravity is in the axial plane of inclination of said longitudinal axis; a marking pointer pivotally mounted on said first orienting weight for rotation about a pivotal axis perpendicular to the plane in which said center of gravity and said longitudinal axis lie, the radial arm length of said pointer being large relative to the radius of said housing; a pendulum pivotally mounted on said orienting weight, the pivotal axis of said pendulum being parallel to the pivotal axis of said marking pointer and the radial arm length of said pendulum being small relative to the radius of said housing to permit said pendulum to swing freely therein through an angle of at least 90° from the said longitudinal axis; means connecting said pendulum to said marker pointer to rotate said marking pointer by said pendulum through an angle which is a predetermined function, less than unity, of the angle through which said pendulum rotates; a support in said tubular housing; a time-controlled compass actuating piston slidable in said support; a second orienting weight mounted on said piston for rotation about said longitudinal axis, said second orienting weight also having a center of gravity which is eccentrically positioned relative to said longitudinal axis whereby said second weight freely rotates about said longitudinal axis to seek a position of equilibrium in the axial plane of inclination of said longitudinal axis; a gimbal ring pivotally mounted on said second orienting weight for rotation about an axis perpendicular to the plane in which said last mentioned center of gravity and said longitudinal axis lie; means for locking and releasing said gimbal ring on said weight; a compass and indicating head seated on said gimbal ring; a compass pivot shaft connecting said gimbal ring and said compass, said pivot shaft being retractable to a compass locking and protecting position and being advanceable to a compass seating and orienting position upon release of said gimbal ring for any angle of well bore inclination from 0° to substantially 90°; and means to move said compass and indicating head into engagement with said marking pointer to record on a chart carried by said compass and indicating head the angle of inclination and the azimuthal direction of such inclination of said well bore as represented by the angular position of said marking pointer.

13. Apparatus for supporting a calibrated chart in an instrument for surveying well bores comprising: a tubular housing; a support therein; a time-controlled compass actuating piston slidable in said support; an orienting weight mounted on said piston for rotation about the longitudinal axis thereof, said orienting weight having a center of gravity which is eccentrically located with respect to said axis whereby said weight freely rotates about said axis to seek a position of equilibrium in the plane of inclination of said axis; a gimbal ring pivotally mounted on said orienting weight for rotation about an axis perpendicular to said plane of inclination; mechanism controlled by the movement of said compass actuating piston for locking said gimbal ring in a position coaxial with said axis and for releasing said gimbal ring for such pivotal movement on said weight; a compass-controlled indicating head for supporting a chart and being engageably seated on said gimbal ring; and a compass pivot shaft controlled by said locking and releasing mechanism for seating said compass-controlled indicating head on such gimbal ring in a protected locked position from which said head is releasable with said gimbal ring to a compass orienting position in which said head is supported by said pivot shaft for recording to the azimuthal angle of inclination of said housing under any well bore inclination from zero to 90°.

References Cited in the file of this patent
UNITED STATES PATENTS

| | | |
|---|---|---|
| 1,163,594 | Fry | Dec. 7, 1915 |
| 2,166,472 | Lake et al. | July 18, 1939 |
| 2,829,443 | Abs | Apr. 8, 1958 |
| 3,008,241 | Murata | Nov. 14, 1961 |